June 9, 1959     A. S. VANDERHOOF     2,889,733
NUT WITH "TEFLON" INSERT
Filed March 19, 1956
FIG. 1     FIG. 2     FIG. 3     FIG. 4
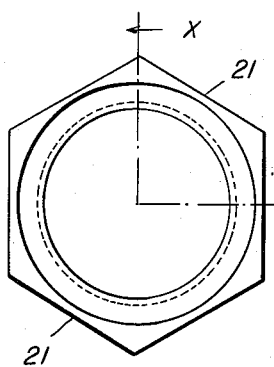
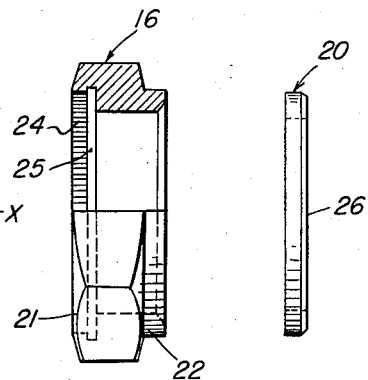
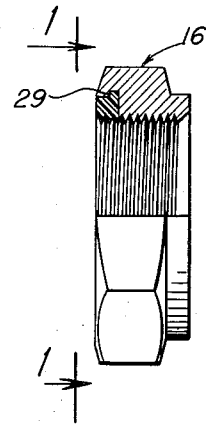
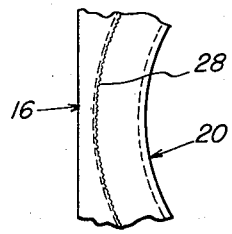
FIG. 5
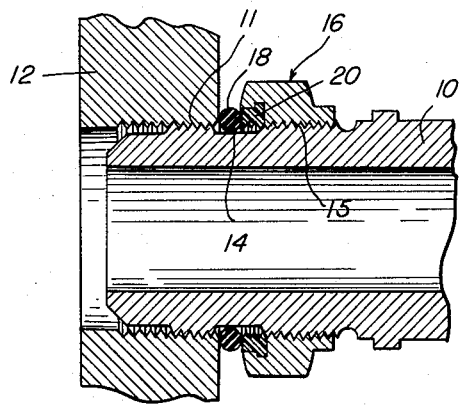
FIG. 6
INVENTOR.
Alton S. Vanderhoof
BY
Churchill, Rich, Weymouth & Engel
Attorneys

United States Patent Office 2,889,733
Patented June 9, 1959

2,889,733

NUT WITH "TEFLON" INSERT

Alton S. Vanderhoof, Irvington, N.J., assignor to Resistoflex Corporation, Roseland, N.J., a corporation of New York Application March 19, 1956, Serial No. 572,520

1 Claim. (Cl. 85—32)

This invention relates to a nut for use on threaded connectors used in fluid conduit systems, more particularly a sealing nut incorporating an insert which functions as a back-up washer for an O-ring seal.

The type of connector with which the nut of the invention is intended for use is one which is currently in widespread use for making connections between metal tubing and flexible hose lines used to interconnect various pieces of apparatus in fluid systems such as hydraulic and pneumatic systems.

The connector has two externally threaded sections between which there is a smooth cylindrical area on which an O-ring gasket is placed. The forward threaded section of the connector is screwed into a tapped hole in a boss on a piece of apparatus and the nut is threaded on the other threaded section. Between the O-ring and the nut a back-up washer has heretofore been used. Initially such washers were made of leather. More recently back-up washers of polytetrafluoroethylene (herein referred to by its trademark "Teflon") have been used. After the forward threaded section of the connector has been screwed into a boss, the nut is tightened against the O-ring which compresses it against the rim of the opening in the boss and the connector, thus making a fluid-tight connection. The purpose of the back-up washer is to prevent direct frictional engagement between the nut and the O-ring and consequent wear and tear on the O-ring.

It has been suggested by others that it would be desirable to provide the face of the nut which is toward the O-ring with a Teflon insert which would take the place of a back-up washer and thus make the use of a separate washer unnecessary. The present invention relates to details of construction of such a nut and to the method of making it.

The invention will best be understood from the following detailed description of the present preferred embodiment thereof read in conjunction with the drawings, in which:

Fig. 1 is a face view of the nut taken on the line 1—1 of Fig. 4;

Fig. 2 is a side elevation of the nut blank in half-section on the line X—X of Fig. 1, before the insert has been put in place;

Fig. 3 is a side elevation of the insert;

Fig. 4 is a view corresponding to Fig. 2 after the insert has been put in place and the nut threaded;

Fig. 5 is a fragmentary elevation of a segment of the nut as seen in Fig. 1 but on a larger scale; and Fig. 6 is a central longitudinal section through a connector screwed into a boss with the nut in place ready to compress the O-ring gasket.

Referring first to Fig. 6, the connector above described is shown at 10. It has a forward threaded section 11 which is screwed into the boss or the like 12. Behind the threaded section 11 is a smooth cylindrical section 14 of slightly less diameter than the root diameter of the threads and behind it a second threaded section 15 which receives the nut 16. The O-ring gasket is shown at 18 surrounding the smooth section 14 of the connector. It will be evident that if the nut 16 is turned on the connector 10 so as to move toward boss 12, it will make a fluid-tight connection between the connector and the boss 12 by compression of the O-ring which squeezes it tightly into the space between the connector, the boss and the nut, sealing the joint. Contact between the nut 16 and the O-ring 18 is made solely through the Teflon insert 20. Teflon is a material with a very low coefficient of friction so that it readily slips on the O-ring without damaging its surface. As is well known, it also has practically universal inertness and withstands temperatures up to 500° F.

Fig. 2 shows the nut blank before it is threaded. It may be provided with the usual wrench-engaging surfaces 21 and may or may not have a short cylindrical rear extension 22. The front face of the nut is provided with a stepped annular recess having an enlargement at its bottom so that there is an outer cylindrical wall 24 and a slightly larger inner cylindrical wall 25, both larger than the bore through the nut blank. The outer wall 24 has a roughened surface which may readily be provided by knurling it so as to create ridges which preferably extend parallel to the axis of the bore of the nut.

There is provided a Teflon ring as shown in Fig. 3 which has an outer diameter about the same as the diameter of the inner cylindrical wall 25 of the recess in the nut blank. This ring preferably has parallel flat faces and its thickness is preferably at least equal to the depth of the recess in the nut blank. To facilitate its introduction into the recess the ring 20 is preferably chamfered as shown at 26, the dimension of the chamfer being about 1/32 of an inch. The ring may readily be made by machining from Teflon tube stock of the desired wall thickness so that its outer dimension may be accurately controlled, its inner diameter not being critical.

To more readily enable the invention to be put into practice, an example of typical dimensions, those of a nut having a diameter of one inch measured between the wrench flats 21 (Fig. 1), and of nominal "–8" size, will now be given in decimal inches: Before knurling, the diameter of the outer cylindrical wall is .902. The diameter of the inner cylinder wall 25 is .927. The total depth of the recess is .136, the depth of the outer wall 24 is .090 and of the inner wall is .046. The outer wall 24 is given a coarse straight knurl of a depth of about .010. The thickness of ring 20 is .142 and its outer diameter is at room temperature .927, about the same as the diameter of the inner wall 25. It will thus be seen that the ring is of slightly larger diameter than the knurled wall 24.

Before inserting ring 20 in the nut blank 16 it is preferably freeze-shrunk in known manner by being mixed with a suitable refrigerant such as solid carbon dioxide or liquid nitrogen. It is then pressed while cold into the recess in the nut blank and expands into gripping engagement with the walls 24 and 25 of the recess. The nut blank and the ring are then threaded together by running a tap in from the side of the nut opposite to that which carries the insert.

Referring to Figs. 4 and 5, it will be seen that the ring 20 is securely locked in the nut blank in two different ways. It is securely locked against rotation by the gripping of the periphery of the ring by the knurling 28 or other form of roughening of wall 24 and it is gripped against axial movement by its expansion behind the shoulder 29 at the junction of the outer wall 24 with the inner wall 25. Thus it is not possible for the threads in the ring to get out of registration with the threads in the nut blank even with repeated use. Neither is it possible for the ring to pull out of the nut axially. Since Teflon has a much higher coefficient of thermal expansion than the metal of the nut, the hotter the nut gets the more tightly the ring is gripped. When the nut is in use, as may be seen in Fig. 6, the front face of the ring 20 makes the only contact between the nut and the O-ring 18 and, due to the inherent slipperiness of Teflon, it is not necessary to use a separate back-up washer to protect the O-ring.

It is to be understood that the invention is not limited to all of the details above set forth merely by way of illustration but is to be construed broadly within the purview of the claim.

What is claimed is:

A nut for compressing an O-ring gasket surrounding a connector on which the nut is threaded, said nut having an annular recess extending inwardly from one face thereof, said recess having an annular enlargement at the bottom thereof so that said recess is defined by an outer cylindrical wall, an inner cylindrical wall of greater diameter, a retaining wall joining said outer and inner walls, and a bottom wall, said outer wall having a plurality of closely spaced axial grooves over its entire surface of a depth less than the difference between the radii of said cylindrical walls; and a ring of solid polytetrafluoroethylene secured in said recess in engagement with said bottom wall; said ring having a radially enlarged circumferential portion occupying said enlargement restrained against relative axial movement by said bottom and retaining walls, a circumferential portion under substantially uniform radially inward compression engaging said outer wall and extending at least partially into said grooves so as to be locked against rotation relative thereto, and a smooth face remote from said bottom wall for engaging the O-ring with the thickness of the ring being slightly greater than the depth of the recess; said nut and said ring having a continuously threaded bore therethrough, whereby the nut can be used repeatedly for the aforesaid purpose without misalignment of the threads in the nut and the ring.

References Cited in the file of this patent

UNITED STATES PATENTS

| | | |
|---|---|---|
| 1,868,037 | Weatherhead | July 19, 1932 |
| 2,017,154 | Larkin | Oct. 15, 1935 |
| 2,080,850 | Frazer | May 18, 1937 |
| 2,351,057 | Luce | June 13, 1944 |
| 2,389,377 | Manning | Nov. 20, 1945 |
| 2,502,642 | Currlin | Apr. 4, 1950 |
| 2,506,069 | Dalton | May 2, 1950 |
| 2,520,121 | Brutus | Aug. 29, 1950 |
| 2,781,552 | Gray | Feb. 19, 1957 |

FOREIGN PATENTS

| | | |
|---|---|---|
| 586,818 | Great Britain | Apr. 1, 1947 |

OTHER REFERENCES

Parker O-Rings Catalog 903, August 1950, published by the Parker Appliance Company, Cleveland, Ohio and Los Angeles, California.